United States Patent
Hsu et al.

(10) Patent No.: US 9,837,932 B2
(45) Date of Patent: Dec. 5, 2017

(54) ELECTRONIC DEVICE AND ELECTRONIC SYSTEM AND OPERATION METHODS THEREOF

(71) Applicant: Wistron Corp., New Taipei (TW)

(72) Inventors: Chih-Ming Hsu, New Taipei (TW); Kuo-Hua Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 701 days.

(21) Appl. No.: 13/953,415

(22) Filed: Jul. 29, 2013

(65) Prior Publication Data
US 2014/0054978 A1 Feb. 27, 2014

(30) Foreign Application Priority Data
Aug. 21, 2012 (TW) .............................. 101130210 A

(51) Int. Cl.
  *H02M 11/00* (2006.01)
  *H02J 9/00* (2006.01)
(52) U.S. Cl.
  CPC .............. *H02M 11/00* (2013.01); *H02J 9/005* (2013.01)
(58) Field of Classification Search
  CPC ...... H01H 47/24; H03K 17/78; H03K 17/941; H05B 37/0218; Y02B 20/46; Y10T 307/773
  USPC ........................................... 307/80, 117, 151
  See application file for complete search history.

(56) References Cited

U.S. PATENT DOCUMENTS

| | | | | |
|---|---|---|---|---|
| 6,107,698 A | * | 8/2000 | Ochiai | H02J 9/005 307/43 |
| 6,465,911 B1 | * | 10/2002 | Takeda | H02J 3/005 307/115 |
| 2005/0065661 A1 | * | 3/2005 | Hirose | G06F 1/26 700/286 |
| 2009/0303653 A1 | | 12/2009 | Pacull | |

(Continued)

FOREIGN PATENT DOCUMENTS

| | | |
|---|---|---|
| CN | 101749835 | 6/2010 |
| TW | I322846 | 4/2010 |
| WO | WO 2011/133119 | 10/2011 |

OTHER PUBLICATIONS

Chinese language office action dated Sep. 6, 2015, issued in application No. CN 20121032273.2.

(Continued)

*Primary Examiner* — Daniel Kessie
(74) *Attorney, Agent, or Firm* — McClure, Qualey & Rodack, LLP

(57) ABSTRACT

An embodiment of the disclosure provides an electronic device including a power supply, an optical to electrical converter and a controller. The power supply outputs a first electric power. The optical to electrical converter receives an infrared light beam and converts the infrared light beam to a second electric power. The controller is coupled to the power supply and the optical to electrical converter. The controller operates in a first mode and a second mode. When the controller operates in the first mode, the controller is activated by the second electric power and after the controller is activated, the controller operates in the second mode and drives the power supply. Then, the controller receives the first electric power and stops receiving the first electric power for operation.

9 Claims, 5 Drawing Sheets

(56) References Cited

U.S. PATENT DOCUMENTS

2011/0140545 A1* 6/2011 Eikum .................. G08C 23/04
  307/117
2014/0042819 A1* 2/2014 Yu .......................... H02J 9/005
  307/80

OTHER PUBLICATIONS

English language translation of relevant paragraphs of Chinese language office action.
English language translation of TW 1322846.
Taiwanese language office action dated Apr. 22, 2014.
English language translation of relevant paragraphs of Taiwanese office action.

* cited by examiner

ELECTRONIC DEVICE AND ELECTRONIC SYSTEM AND OPERATION METHODS THEREOF

CROSS REFERENCE TO RELATED APPLICATIONS

This Application claims priority of Taiwan Patent Application No. 101130210, filed on Aug. 21, 2012, the entirety of which is incorporated by reference herein.

BACKGROUND

Field

The disclosure relates to an electronic device, and more particularly, to an electronic device that does not consume power when in a standby mode.

Description of the Related Art

Nowadays, electronic devices still consume power in a standby mode. Thus, electronic devices still waste power. However, if there is no standby power to provide to a controller of the electronic device, a user cannot turn on the electronic device via a remote controller. Thus, it would not be convenient to the user.

BRIEF SUMMARY

An embodiment of the disclosure provides an electronic device comprising a power supply, an optical to electrical converter and a controller. The power supply outputs a first electricity. The optical to electrical converter receives an infrared light beam from a remote controller and converts the infrared light beam into a second electricity. The controller is coupled to the power supply and the optical to electrical converter to operate in a first mode or a second mode, wherein when the controller operates in the second mode, the controller is powered by the second electricity, and after the controller is powered by the second electricity, the controller operates in the first mode to drive the power supply, and then, the controller receives the second electricity and stops receiving the first electricity.

Another embodiment of the disclosure provides an electronic system. The electronic system comprises a remote controller and an electronic device. The remote controller outputs an infrared (IR) light beam. The electronic device comprises a power supply, an optical to electrical converter and a controller. The power supply outputs a first electricity. The optical to electrical converter receives an infrared light beam from a remote controller and converts the infrared light beam into a second electricity. The controller is coupled to the power supply and the optical to electrical converter to operate in a first mode or a second mode, wherein when the controller operates in the second mode, the controller is powered by the second electricity, and after the controller is powered by the second electricity, the controller operates in the first mode to drive the power supply, and then, the controller receives the second electricity and stops receiving the first electricity.

Another embodiment of the disclosure provides an operation method for an electronic device operating in a standby mode without any power, wherein the electronic device comprises a power supply, outputting a first electricity with a first power that is larger than the minimum operating power of a controller, and an optical to electrical converter, receiving and converting an infrared light beam from a remote controller into a second electricity, wherein the controller is coupled to the power supply and the optical to electrical converter. The method comprises the steps of: receiving the infrared light beam and determining whether the infrared light beam contains a power start signal; controlling the power supply, by the controller, to output the second electricity, wherein the controller is operated at the normal node when receiving the power start signal, and stopping receiving the second electricity output by the optical to electrical converter.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
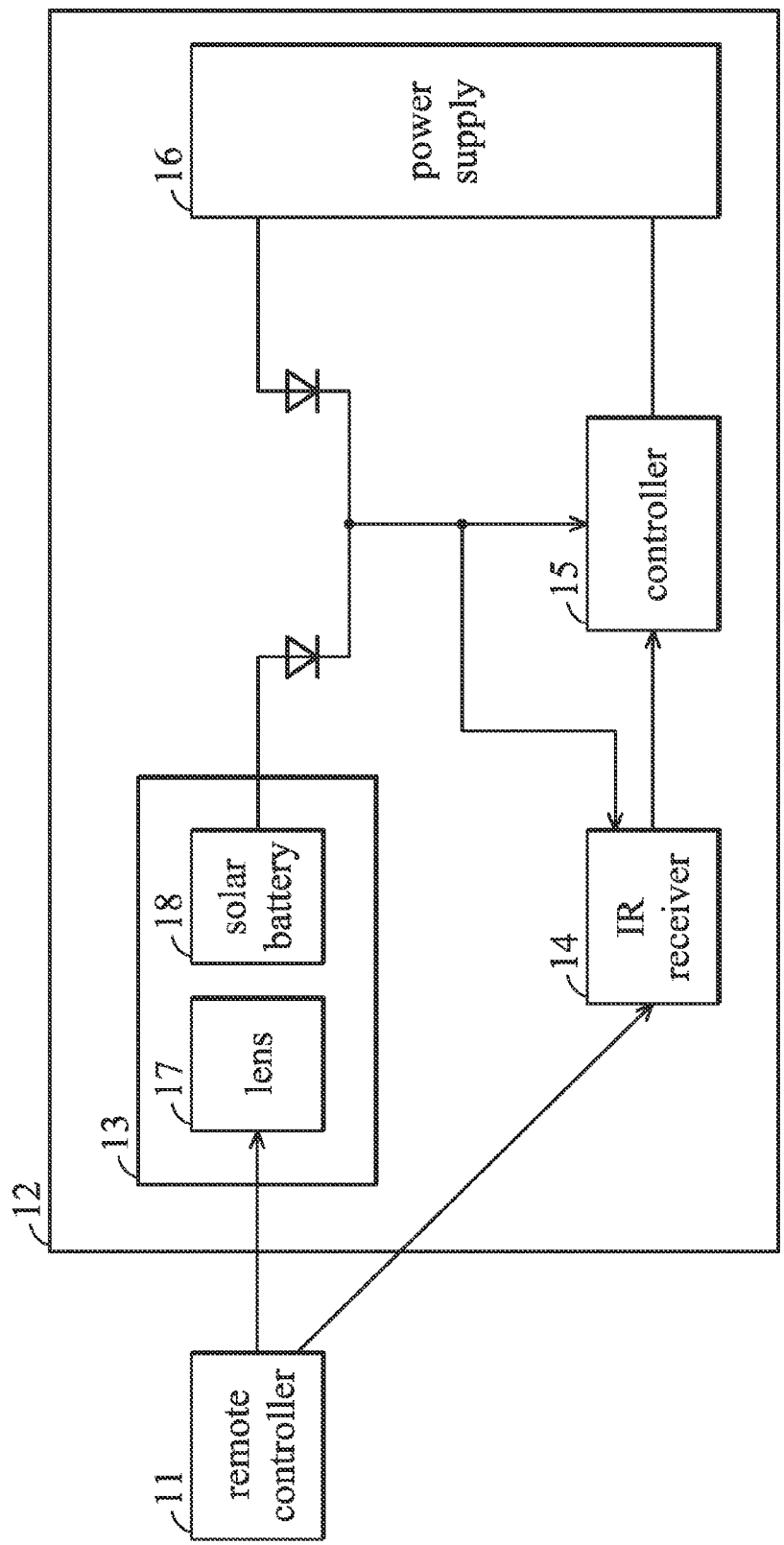
FIG. 1 is a schematic diagram of an electronic system according to an embodiment of the disclosure.

FIG. 1 is a schematic diagram of an electronic system according to an embodiment of the disclosure. The electronic system comprises a remote controller 11 and an electronic device 12. The electronic device 12 may be a television, a DVD player, a Blue-ray player or any device that can be controlled by an IR remote controller. The electronic device 12 comprises an optical to optical to electrical converter 13, an IR receiver 14, a controller 15 and a power supply 16. The optical to optical to electrical converter 13 comprises a lens 17 and a solar battery 18. The lens 17 filters light beams and only allows a first light beam having a wavelength that is within a specific range to pass through the lens 17. The wavelength range is determined according to the wavelength of the IR light beam. In this embodiment, the wavelength range is between 770 nm and 1000 nm.

The solar battery 18 receives a first light beam which passes through the lens 17 and converts the first light beam into a first electricity. In this embodiment, the solar battery 18 is designed to only convert the light beam having a wavelength that is within the range of the IR wavelength. In another embodiment, the solar battery 18 converts both visible light and invisible light into electricity. Since the lens 17 only allows the light beam having a wavelength that is within the range of the IR wavelength to pass therethrough, the solar battery 18 still converts only the light beam having the wavelength that is within the range of the IR wavelength to the first electricity and outputs the first electricity.

The controller 15 can operate in a first mode or a second mode. In this embodiment, the first mode is a normal mode and the second mode is a standby mode. Although a normal mode and a standby mode are illustrated in the embodiment, the disclosure is not limited thereto. The second mode can be a power off mode or a power saving mode.

When the controller 15 operates in the standby mode, the controller 15 establishes a first electric transmission path between the controller 15 and the optical to electrical converter 13 and cuts off a second electric transmission path between the controller 15 and the power supply 16. When the controller 15 receives the first electricity via the first electric transmission path, the controller 15 can be set to operate in a standby mode or a normal mode. The IR receiver 14 is also activated by the first electricity and receives an IR light beam output from the remote controller 11 and transmits an IR data to the controller 15. When the controller 15 receives the IR data, the controller 15 determines whether the IR data matches with a power start signal. When the IR data matches with a power start signal, the controller 15 operates in the first mode and drives the power supply 16. The controller then establishes the second electric transmission path and cuts off the first electric transmission path.

In one embodiment, the optical to electrical converter 13 is placed near to the IR receiver 14, and the optical to electrical converter 13 and the IR receiver 14 may receive the IR light beam output from the remote controller 11, simultaneously. In another embodiment, the optical to electrical converter 13 and the IR receiver 14 are integrated into one device. The IR light beam passes through to the IR receiver 14 and reaches the optical to electrical converter 13. The optical to electrical converter 13 then applies an optical to electricity conversion process to the received IR light beam.

In the embodiment, the power supply 16 also provides power to other circuits or devices in the electronic device 12, but, when the power supply 16 is driven only by the controller 15, the power supply 16 provides power to other circuits or devices in the electronic device 12. In other words, if the power supply 16 is not driven by the controller 15, the power supply 16 does not output power or electricity and the electronic device 12 is totally powered down to save power.

When the controller 15 operates in the normal mode, the IR receiver 14 continuously receives the IR data from the remote controller 11 and transmits the received IR data to the controller 15 to execute corresponding functions. When the received IR data matches with a power down signal, the controller 15 stops receiving the first electricity and receives the second electricity. In other words, the controller establishes the first electric transmission path and cuts off the second electric transmission path. Then, the controller 15 turns off the power supply 16 and enters the standby mode.

In the FIG. 1, to ensure that the controller 15 can be driven by the first electricity, the energy provided by the first electricity must be larger than the minimum energy required by the controller 15. Please refer to FIG. 2.

Figure 2:
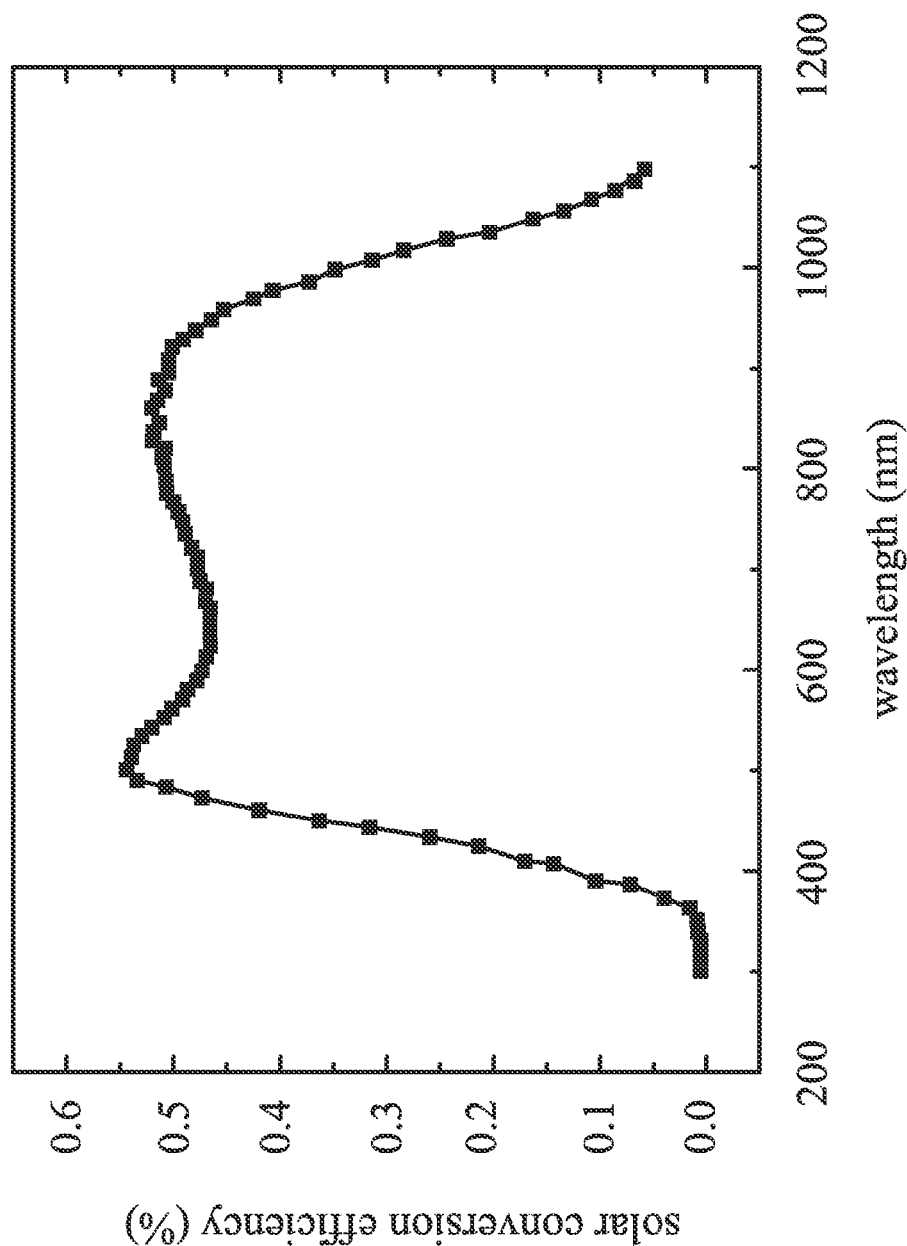
FIG. 2 is a schematic diagram showing the relationship between solar conversion efficiency and corresponding wavelengths.

FIG. 2 is a schematic diagram showing the relationship between solar conversion efficiency and corresponding wavelengths. Assuming the wavelength of the IR light beam is 940 nm, then the corresponding solar conversion efficiency is substantially 0.47%. Take a controller, having a working current of 34 μa and working voltage of 1.8V, for example, the minimum power required by the controller is 61 μw. Thus, the minimum energy of the IR light beam which reaches the solar battery is:

$$61\ \mu w/0.47\% = 12.97\ mW$$

For the current design of the remote controller, the power output by the LED of the remote controller can reach 15 mW, at least, and the LED can be replaced by LEDs that output more power according to requirements. Therefore, using the IR light beam output by the remote controller to drive the controller of the electronic device is feasible.

Figure 3:
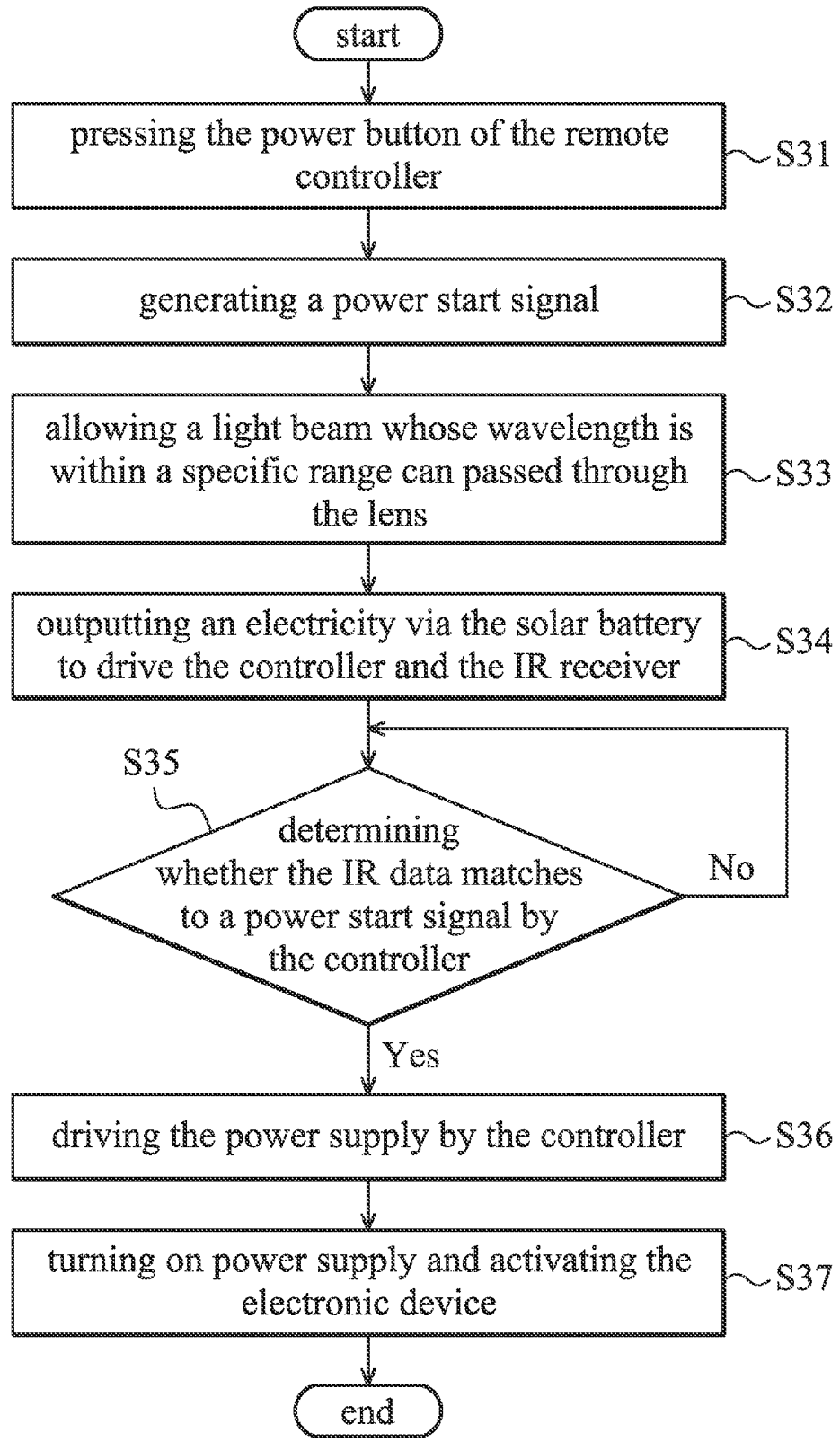
FIG. 3 is a flowchart of an operating method to activate an electronic device via a remote controller according to an embodiment of the disclosure.

FIG. 3 is a flowchart of an operating method to activate an electronic device via a remote controller according to an embodiment of the disclosure. In step S31, the user presses the power button of the remote controller for a predetermined duration. In step S32, the remote controller generates and transmits a power start signal to an electronic device via an IR light beam. The electronic device comprises an IR receiver and an optical to electrical converter. The optical to electrical converter comprises a lens and only the IR light beam or a light beam having a wavelength that is within a specific range can pass through the lens.

In one embodiment, the optical to electrical converter is placed near to the IR receiver, and the optical to electrical converter and the IR receiver may receive the IR light beam output from the remote controller 11, simultaneously. In another embodiment, the optical to electrical converter and the IR receiver are integrated into one device. The IR light beam passes through the IR receiver and reaches the optical to electrical converter. The optical to electrical converter then applies an optical to electricity conversion process to the received IR light beam.

In step S34, a solar battery in the optical to electrical converter outputs electricity to drive the controller and the IR receiver. In step S35, the controller receives an IR data received by the IR receiver and determines whether the IR data matches with a power start signal. When the IR data matches with the power start signal, step S36 is executed and the controller drives the power supply. If the IR data does not match the power start signal, the controller does nothing. In step S37, the power supply is turned on and the electronic device is activated. The controller is then powered by the power supply.

Figure 4:
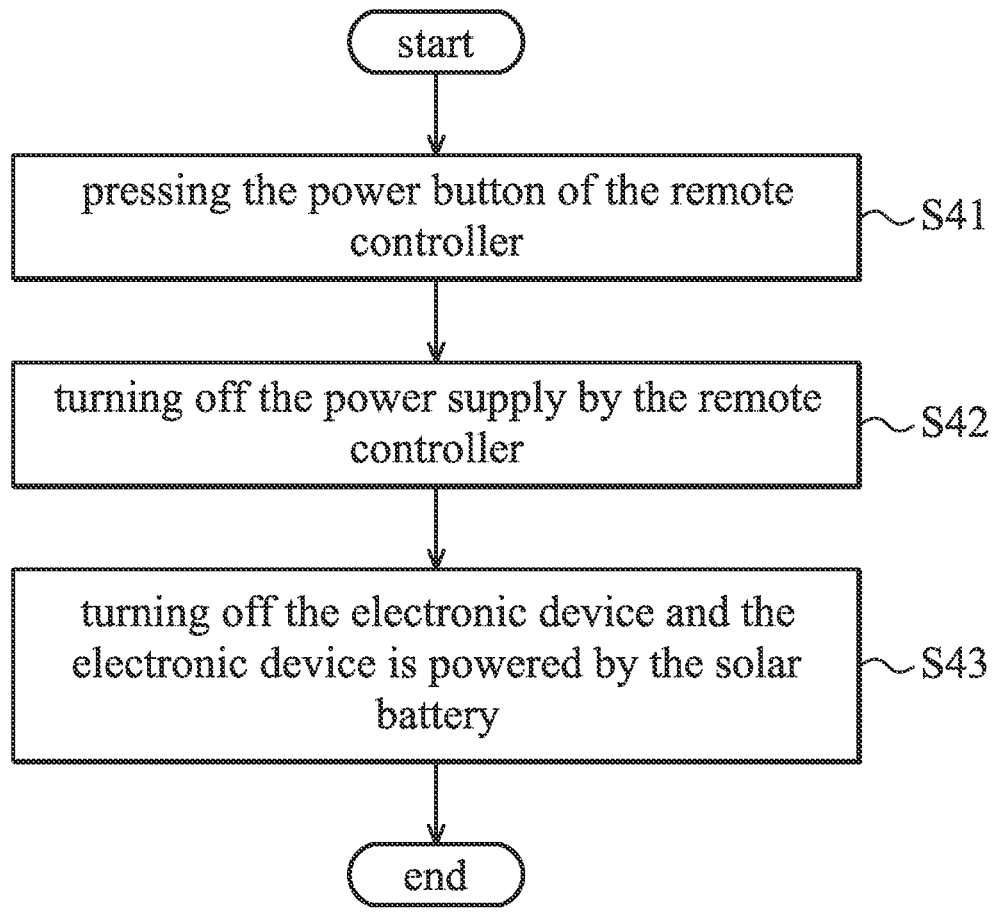
FIG. 4 is a flowchart of an operating method to turn off an electronic device via a remote controller according to an embodiment of the disclosure.

FIG. 4 is a flowchart of an operating method to turn off an electronic device via a remote controller according to an embodiment of the disclosure. In step S41, the user presses the power button of the remote controller to generate and transmit a power down signal to an electronic device via an IR light beam. In step S42, the controller turns off the power supply. In the step S43, the system of the electronic device is turned off, and a controller switches its power source to a solar battery of an optical to electrical converter.

Figure 5:
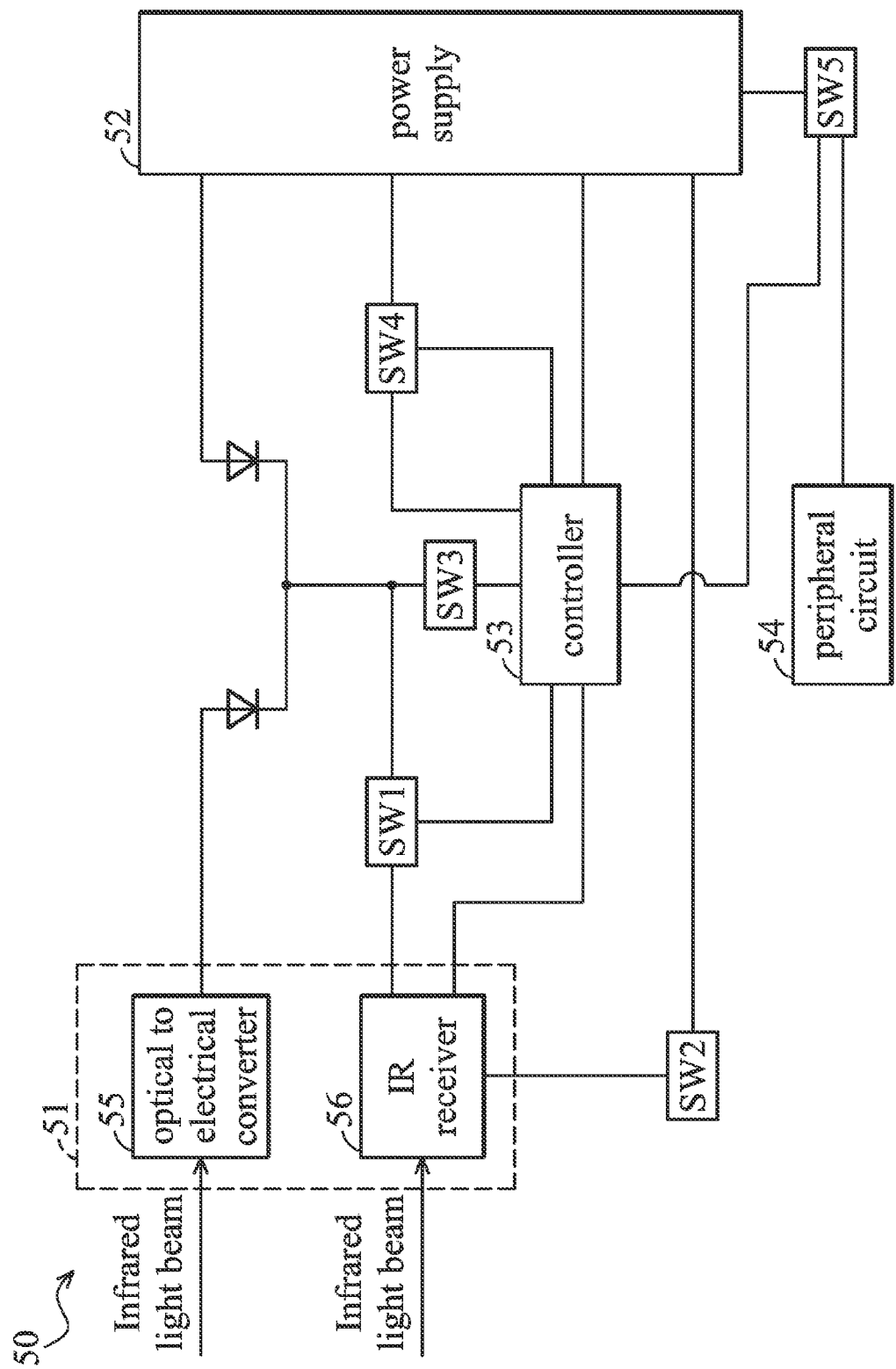
FIG. 5 is a schematic of an electronic device according to an embodiment of the disclosure.

FIG. 5 is a schematic of an electronic device according to an embodiment of the disclosure. The electronic device 50 comprises a photovoltaic module 51, a power supply 52, a controller 53 and a peripheral circuit 54. The electronic device 50 may be a television, a DVD player, a Blue Ray player or any device that can be controlled by an IR remote controller. The photovoltaic module 51 comprises an optical to electrical converter 55 and an IR receiver 56. The optical to electrical converter 55 receives an IR light beam and converts the IR light beam into a first electricity.

The controller 53 can operate in a first mode or a second mode. In this embodiment, the first mode is a normal mode and the second mode is a standby mode. Although a normal mode and a standby mode are illustrated in the embodiment, the disclosure is not limited thereto. The second mode can be a power off mode or a power saving mode.

When the controller operates in the standby mode, the controller 53 establishes a first electric transmission path between the controller 53 and the optical to electrical converter 55 and cuts off a second electric transmission path between the controller 53 and the power supply 52. In other words, when the controller operates in the standby mode, the third switch SW3 is turned on and the fourth switch SE4 is turned off.

When the controller 53 receives the first electricity via the first electric transmission path, the controller 53 can operate in the standby mode or the normal mode. The controller 53 turns on the first switch SW1 and the IR receiver 56 is also activated by the first electricity. The IR receiver 56 receives the IR light beam from the remote controller and transmits an IR data to the controller 53. When the controller 53 receives the IR data, the controller 53 determines whether the IR data matches with a power start signal. When the controller 53 determines that the IR data matches with a power start signal, the controller 53 drives the power supply 52. The controller 53 turns on the fourth switch SW4 to establish the second electric transmission path and turns off the third switch SW3 to cut off the first electric transmission path when receiving a second electricity from the power supply 52.

Furthermore, the controller turns off the first switch SW 1 and turns on the second SW2 so that the IR receiver 56 is also powered by the power supply 52. In this embodiment, the power supply 52 also provides power to the peripheral circuit 54. When the power supply 52 is driven by the controller 53, the fifth switch SW5 is turned on due to the control of the controller 53. Thus, the power supply 52 can provide power to the peripheral circuit 54. In this embodiment, the controller 53 turns on the fifth switch SW5 only when the controller 53 operates in the normal mode. In other words, when the electronic device 50 operates in the standby mode, the power supply 52 does not output power and the electronic device 50 is totally powered down to save power.

In one embodiment, the optical to electrical converter 55 is placed near to the IR receiver 53, and the optical to electrical converter 55 and the IR receiver 53 may receive the IR light beam output from the remote controller, simultaneously. In another embodiment, the optical to electrical converter 55 and the IR receiver 53 are integrated into one device. The IR light beam passes through the IR receiver 53 and reaches the optical to electrical converter 55. The optical to electrical converter 55 then applies an optical to electricity conversion process to the received IR light beam.

When the controller 53 operates in the normal mode, the IR receiver 56 continuously receives the IR data from the remote controller and transmits the received IR data to the controller 53. The controller 53 then executes corresponding operations or functions. When the IR data matches with a power down signal, the controller 53 stops receiving the first electricity and receives the second electricity. In other words, the controller establishes the first electric transmission path and cuts off the second electric transmission path. Then, the controller 53 turns off the power supply 52 and enters the standby mode.

In FIG. 5, to ensure that the controller 53 can be driven by the first electricity, the energy or power of the first electricity must be larger than the minimum power or energy required by the controller 53 and the IR receiver 56.

While the disclosure has been described by way of example and in terms of the preferred embodiments, it is to be understood that the disclosure is not limited to the disclosed embodiments. To the contrary, it is intended to cover various modifications and similar arrangements (as does be apparent to those skilled in the art). Therefore, the scope of the appended claims should be accorded the broadest interpretation so as to encompass all such modifications and similar arrangements.

What is claimed is:

1. An electronic device, comprising:
a power supply, outputting a first electricity;
an optical to electrical converter, receiving an infrared light beam from a remote controller and converting the infrared light beam into a second electricity; and
a controller coupled to the optical to electrical converter via a first electric transmission path having a first diode and the controller is coupled to the power supply via a second electric transmission path having a second diode, the controller being configured to operate in either a first mode or a second mode, wherein when the controller operates in the second mode, the controller is powered by the second electricity via the first electric transmission path, and after the controller is powered by the second electricity, the controller operates in the first mode and provides a signal to drive the power supply, wherein, in response to the power supply receiving the signal from the controller, the power supply provides the first electricity to the controller via the second transmission path, which first electricity reverse biases the first diode and the controller stops receiving the second electricity via the first transmission path;
an infrared receiver, wherein when the controller is powered up by the second electricity, the infrared receiver is also powered by the second electricity, and the infrared receiver receives the infrared light beam to transmit infrared data to the controller;
wherein when the controller receives the infrared data, the controller determines whether the infrared data matches with a power start signal, and when the infrared data is determined to match with the power start signal, the controller operates in the first mode and drives the power supply with the signal, wherein when the infrared data matches with a power down signal, the controller stops driving the power supply with the signal and therefore turns off the power supply to enter the second mode, which results in the second diode becoming reverse biased, and thus the controller stops receiving the first electricity via the second transmission path, and instead receives the second electricity via the first transmission path.

2. The electronic device as claimed in claim 1, wherein the optical to electrical converter further comprises:
a lens to receive a light beam and the infrared light beam, allowing only the infrared light beam having a wavelength that is within a specific range to pass through the lens; and
a solar battery to convert the infrared light beam into the second electricity.

3. The electronic device as claimed in claim 1, wherein when the power supply is not driven by the controller, the power supply does not output the first electricity.

4. The electronic device as claimed in claim 3, wherein a first power of the first electricity is larger than the minimum operating power of the controller.

5. An electronic system, comprising:
a remote controller to output an infrared light beam; and
an electronic device, comprising:
a power supply, outputting a first electricity;

an optical to electrical converter, receiving an infrared light beam from a remote controller and converting the infrared light beam into a second electricity; and a controller coupled to the optical to electrical converter via a first electric transmission path having a first diode and the controller is coupled to the power supply via a second electric transmission path having a second diode, the controller being configured to operate in either a first mode or a second mode, wherein when the controller operates in the second mode, the controller is powered by the second electricity via the first electric transmission path, and after the controller is powered by the second electricity, the controller operates in the first mode and provides a signal to drive the power supply, wherein, in response to the power supply receiving the signal from the controller, the power supply provides the first electricity to the controller via the second transmission path, which first electricity reverse biases the first diode and the controller stops receiving the second electricity via the first transmission path;

an infrared receiver, wherein when the controller is powered up by the second electricity, the infrared receiver is also powered by the second electricity, and the infrared receiver receives the infrared light beam to transmit infrared data to the controller;

wherein when the controller receives the infrared data, the controller determines whether the infrared data matches with a power start signal, and when the infrared data matches with the power start signal, the controller operates in the first mode and drives the power supply, wherein when the infrared data matches with a power down signal, the controller stops driving the power supply with the signal and therefore turns off the power supply to enter the second mode, which results in the second diode becoming reverse biased, and thus the controller stops receiving the first electricity via the second transmission path, and instead receives the second electricity via the first transmission path.

6. The electronic system as claimed in claim 5, wherein the optical to electrical converter further comprises:

a lens to receive a light beam and the infrared light beam, allowing only the infrared light beam having a wavelength that is within a specific range to pass through the lens; and a solar battery to convert the infrared light beam into the second electricity.

7. The electronic system as claimed in claim 5, wherein when the power supply is not driven by the controller, the power supply does not output the first electricity.

8. The electronic system as claimed in claim 5, wherein a first power of the first electricity is larger than the minimum operating power of the controller.

9. An operation method for an electronic device operating in a standby mode without any power, wherein the electronic device comprises a power supply, outputting a first electricity with a first power that is larger than the minimum operating power of a controller, an optical to electrical converter, receiving and converting an infrared light beam from a remote controller into a second electricity, a controller coupled to the power supply via a second path including a second diode and the controller couple to the optical to electrical converter via a first path including a first diode, and an infrared receiver, the method comprising the following steps of:

in response to receiving the infrared light beam, powering the infrared receiver by the second electricity when the controller is powered up by the second electricity;

determining whether the infrared light beam contains a power start signal;

controlling the power supply, by the controller, to output the first electricity in response to a detection of the power start signal, wherein the controller is operated in a normal mode when receiving the power start signal;

stop receiving the second electricity output by the optical to electrical converter when receiving the power start signal by reverse biasing the first diode in the first electric transmission path; and in response to detecting a power down signal, turning off the power supply by the controller, and stop receiving the first electricity by reverse biasing the second diode in the second electric transmission path, wherein the controller thereafter receives and is powered by the second electricity from the optical to electrical converter via the first transmission path and the controller then operates in the standby mode.

* * * * *